(12) United States Patent
Perrin et al.

(10) Patent No.: US 8,670,113 B2
(45) Date of Patent: Mar. 11, 2014

(54) SIMPLIFIED CHECKING BENCH FOR TELESCOPES AND AUTO-CHECKABLE TELESCOPES

(75) Inventors: Guillaume Perrin, La colle s/Loup (FR); Arnaud Liotard, Grasse (FR); Hervé Benard, Montauroux (FR)

(73) Assignee: Thales, Neuilly sur Seine (FR)

( * ) Notice: Subject to any disclaimer, the term of this patent is extended or adjusted under 35 U.S.C. 154(b) by 163 days.

(21) Appl. No.: 13/403,731

(22) Filed: Feb. 23, 2012

(65) Prior Publication Data

US 2013/0057851 A1    Mar. 7, 2013

(30) Foreign Application Priority Data

Feb. 24, 2011  (FR) ...................................... 11 00549

(51) Int. Cl.
*G01M 11/00* (2006.01)
(52) U.S. Cl.
USPC ........................................................ 356/124.5
(58) Field of Classification Search
USPC ............................................. 356/124, 124.5
See application file for complete search history.

(56) References Cited

U.S. PATENT DOCUMENTS

| | | | | |
|---|---|---|---|---|
| 5,410,408 A | * | 4/1995 | Evans et al. | 356/513 |
| 6,999,182 B2 | * | 2/2006 | Thibault | 356/513 |
| 8,511,842 B1 | * | 8/2013 | Sacco | 359/846 |
| 2003/0222196 A1 | * | 12/2003 | Hutchin et al. | 250/201.9 |
| 2011/0310502 A1 | | 12/2011 | Blanchard et al. | |

FOREIGN PATENT DOCUMENTS

| | | |
|---|---|---|
| EP | 0692707 A1 | 1/1996 |
| FR | 2722571 A1 | 7/1994 |
| FR | 2920536 A1 | 3/2009 |

OTHER PUBLICATIONS

Hu Ningsheng, "Testing Large Telescope Mirrors in the Optical Shop by an Autocollimation Method with Multiple Pendulum Flat Mirrors", Applied Optics, Aug. 15, 1980, pp. 2680-2682, vol. 19, No. 16, XP55009942.

* cited by examiner

*Primary Examiner* — Roy M Punnoose
(74) *Attorney, Agent, or Firm* — Baker Hostetler LLP

(57) ABSTRACT

In the field of optical checking of optical instruments of telescope type, an instrument comprises an optical objective, a photo-detection housing arranged at the focus of said optical objective and at least one light source arranged in the vicinity of said photo-detection housing, the optical pupil of the optical objective having a first diameter. The checking means comprise a plane mirror having a second diameter that is smaller than the first diameter and means to arrange the plane mirror such that the image of the light source given by the optical objective and reflected by said plane mirror is focused on the photo-detection housing, means for analyzing said image received making it possible to determine the optical quality of the telescope. The plane mirror may be associated with an autonomous checking bench. It may also form part of the telescope and be incorporated into the protection hood for the optic.

12 Claims, 3 Drawing Sheets

SIMPLIFIED CHECKING BENCH FOR TELESCOPES AND AUTO-CHECKABLE TELESCOPES

CROSS-REFERENCE TO RELATED APPLICATION

This application claims priority to foreign French patent application No. FR 1100549, filed on Feb. 24, 2011, the disclosure of which is incorporated by reference in its entirety.

FIELD OF THE INVENTION

The field of the invention is that of the checking and measurement of the optical quality of optical instruments comprising optical elements of large dimension, of telescope type.

BACKGROUND

The measurement of optical performance is the key point of the program of tests of a telescope after its assembly. More exactly this entails carrying out a set of measurements before and after a certain number of trials in vibratory or thermal environments so as to check the variations in the optical performance of the instrument when it undergoes diverse constraints.

The optical quality of the instrument is characterized by a wavefront phase error, also called the "WFE", the acronym standing for "Wave-Front Error". This WFE takes into account the aberrations of the mirrors of the telescope, and also the various defects of alignment of the mirrors constituting the telescope or of the detector with respect to the telescope. Knowing the WFE, the Optical Transfer Function of the telescope, also denoted OTF, is deduced therefrom. This function is linked to the former by a conventional auto-correlation relation. Knowing the optical transfer function OTF, the Modulation Transfer Function MTF of the instrument is then calculated by switching to the modulus of the optical transfer function. The defects of alignment between the various components of the instrument not being predictable, measurement of the MTF is indispensable for characterizing the instrument.

Currently, measurement of the MTF of a telescope requires the use of very precisely adjusted optical components of high optical quality, of diameter at least equal to that of the telescope and arranged in a thermally and mechanically stabilized vacuum enclosure in order to filter the vibrations.

Such measurement is therefore extremely expensive, the hardware required comprising at least one optical collimator of large dimension and a stabilized vacuum enclosure together equals several million euros. This cost becomes prohibitive when dealing with checking a large telescope outside of its manufacturing unit in operational use. Indeed, it becomes impossible to envisage a conventional MTF measurement at the end customer, in the course of programs of tests with a checking bench dedicated to this single telescope.

It is therefore important to find a technical solution other than that of the "conventional" optical checking bench for keeping track of the optical performance of an instrument. Ideally, this solution must require limited recourse to optical means other than those of the telescope, while guaranteeing quality of the performance measurement.

Various technical solutions are possible. They may be grouped into three main types.

The technical solutions of the first type consist in analyzing the optical image of a known external source, image obtained at the focus of the telescope so as to determine the optical performance of the telescope. This type of solution comprises various alternatives. It is possible to use a collimator and a conventional MTF measurement procedure. It is also possible to use a wavefront analyzer. It is also possible to acquire the images of contrasted objects situated at infinity such as certain stars or the moon.

A second type of technical solution consists in implementing a wavefront analyzer on the instrument. The Shack-Hartmann procedure, consisting in carrying out a sampling of the entrance pupil to measure the WFE locally, will be cited for example.

A third type of solution consists in measuring the geometric characteristics of the instrument. The measurement of the distance separating the primary and secondary mirrors, videogrammetry techniques, laser-based or "laser tracker" measurement techniques or else interferometry probes, will be cited for example.

All these measurements present a certain number of drawbacks, either at the level of the cost of the test means to be implemented, or at the level of the complexity of the measurement procedure, of the performance achieved, or of the constraints on the design of the instrument.

Patent FR 2 722 571 describes a method making it possible to characterize an optics instrument by autocollimation, the instrument comprising a detection assembly situated in the focal plane of the optic and the test bench a plane mirror of large dimension arranged in front of the entrance pupil of the instrument. This simple system still exhibits a drawback. It is necessary to employ a plane mirror of size equivalent to that of the pupil of the instrument.

SUMMARY OF THE INVENTION

The device according to the invention does not exhibit these drawbacks. It implements an autocollimation mirror of smaller dimensions than those of the pupil. It is clear that this mirror allows only partial characterization of the instrument. It is however sufficient in a large number of applications where the aim of the characterization is not so much to obtain absolute performance of the telescope but rather to measure its variations either over time or subsequent to endurance or environmental trials. In this case, the variations in the performance may be detected on a partial characterization.

More precisely, a first subject of the invention is an optical checking bench for optical instrument of telescope type, the instrument comprising an optical objective, a photo-detection housing arranged at the focus of said optical objective and at least one light source arranged in the vicinity of said photo-detection housing, the optical pupil of the optical objective having a first diameter, characterized in that the bench comprises at least one plane mirror having a second diameter that is smaller than the first diameter and means making it possible to arrange this plane mirror in such a way that the image of the light source given by the optical objective and reflected by said plane mirror is focused on the photo-detection housing, the bench comprising means for analyzing said image received making it possible to determine the optical quality of the telescope.

Advantageously, the analysis means comprise a wavefront analyzer for the images received so as to estimate the "WFE" of the instrument.

Advantageously, the ratio of the second diameter to the first diameter lies between 30% and 80% and more precisely, the ratio of the second diameter to the first diameter equals about 60%.

Advantageously, the light source comprises at least one illuminating source and one optical fibre one of the ends of which is arranged in the vicinity of the photosensitive surface of the photo-detection housing. In a variant, the light source comprises at least two illuminating optical fibres, the optical objective working at a predetermined wavelength, the first optical fibre being arranged in a first plane perpendicular to the optical axis of the objective and the second optical fibre arranged in a second plane parallel to the first plane and offset with respect to this first plane.

A second subject of the invention is an optical telescope comprising an optical objective, a photo-detection housing arranged at the focus of said optical objective and at least one light source arranged in the vicinity of said photo-detection housing, the optical pupil of the optical objective having a first diameter, the telescope also comprising a movable hood having two positions, a first open or usage position making it possible to uncover the whole of the pupil of the objective and a second closed or test position making it possible to protect the whole of the pupil of the objective, characterized in that the movable hood comprises a plane mirror having a second diameter that is smaller than the first diameter and arranged in such a way that, the movable hood being in the closed position, the image of the light source given by the optical objective and reflected by said plane mirror is focused on the photo-detection housing, the telescope comprising means for analyzing said image received making it possible to determine the optical quality of the telescope.

Advantageously, the ratio of the second diameter to the first diameter lies between 30% and 80%. Preferably, the ratio of the second diameter to the first diameter equals about 60%.

Advantageously, the light source comprises at least one illuminating source and one optical fibre one of the ends of which is arranged in the vicinity of the photosensitive surface of the photo-detection housing. In a variant embodiment, the light source comprises at least two illuminating optical fibres, the optical objective working at a predetermined wavelength, the first optical fibre being arranged in a first plane perpendicular to the optical axis of the objective and the second optical fibre arranged in a second plane parallel to the first plane and offset with respect to this first plane.

Advantageously, the analysis means comprise at least one wavefront analyzer for the images received so as to estimate the "WFE" of the instrument.

BRIEF DESCRIPTION OF THE DRAWINGS

The invention will be better understood and other advantages will become apparent on reading the description which follows given without limitation and by virtue of the appended figures among which.

DETAILED DESCRIPTION

Figure 1:
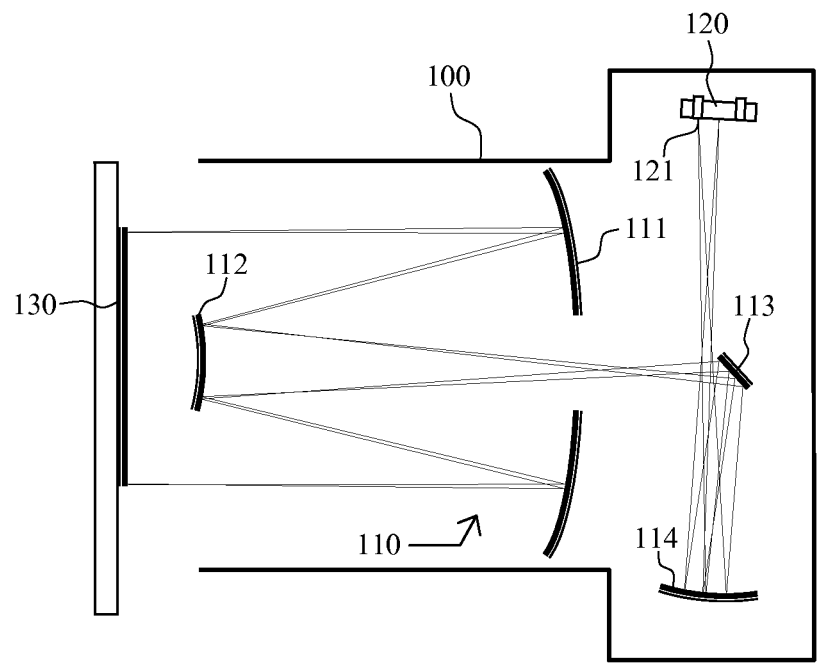
FIG. 1 represents an optical checking bench according to the invention.
Figure 2:
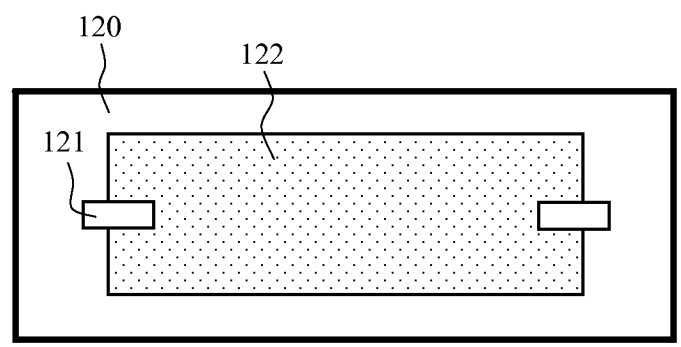
FIG. 2 represents a photo-detection housing according to the invention.

In FIG. 1 have been represented solely a telescope and the auto-collimation mirror necessary for the checking thereof, this constituting the crux of the invention. The mechanical means making it possible to keep the telescope and this mirror aligned are not represented. They do not represent any particular technical difficulty of implementation. The means of electronic analysis required for the utilization of the image arising from the photo-detection housing of the telescope are not depicted either.

As seen in FIG. 1, the telescope 100 comprises an optical objective 110 and a photo-detection housing 120 arranged at the focus of said optical objective. Generally, telescopes of large dimension comprise catoptric objectives having mirrors. Thus, the objectives of the telescopes of FIGS. 1 and 3 comprise a large primary mirror 111 of a first diameter, a secondary mirror 112, a fold-back mirror 113 and a tertiary mirror 114.

Figure 4:
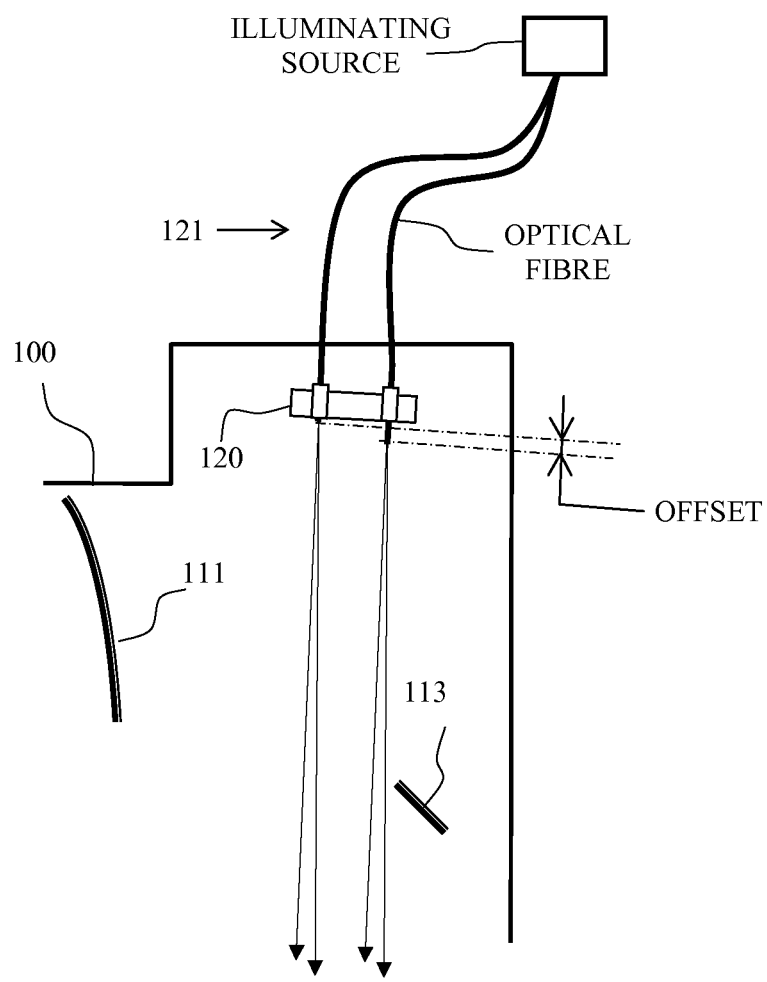
FIG. 4 illustrates a portion the apparatus shown in FIG. 1, including an illuminating source and optical fibres.

The test bench according to the invention requires that the telescope comprise specific facilities. It is necessary for the photo-detection block 120 to comprise at least one light source 121 arranged in the vicinity of said photo-detection housing. The constraints entailed by this placement of sources are minor in so far as it is not necessary to touch the optical architecture or the mechanical structure of the telescope. FIG. 4 shows the light source 121 as including at least one illuminating source connected by optical fibres, to the photo-detection block 120.

To carry out a measurement of the performance of the telescope, a plane mirror 130 is arranged in auto-collimation on the optical axis of the telescope. This mirror 130 has a second diameter which is smaller than that of the large mirror 111. If the light source or sources 121 arranged in the vicinity of the photo-detection block 120 is or are illuminated, their image given by the optic of the telescope and by reflection on the plane mirror 130 is focused on the photo-sensitive surface 122 of said block. The path of the light rays through the optic 110 of the telescope is represented by thin lines in FIGS. 1 and 3.

This image is thereafter processed to deduce therefrom the optical quality of the telescope. It is possible to use, for example, a wavefront analyzer to estimate the "WFE" of the instrument. II is possible to record several successive "WFEs", and then to post-process the estimated "WFEs", so as to calculate via a numerical model the optical performance of the instrument which may be, for example, its MTF.

The possibility of checking the WFE of the instrument several times in the test phase is entirely beneficial for determining the origin of a decline or loss of optical performance. It is indeed easy to go back to information about the displacement of the mirrors on the basis of this WFE rather than on the basis of the MTF of the instrument.

The benefit of the checking method is that it is not necessary to use an auto-collimation mirror having a diameter at least equal to that of the primary mirror of the instrument in so far as, in a large number of applications, and in particular during the endurance or environmental trials, it is more important to monitor possible drifts in the optical quality of the instrument rather than its absolute performance. Indeed, proper operation of the procedure relies on the assumption that only low frequencies of the WFE of the instrument are at risk of being affected during the test phase, the estimations in the reduced pupil being extrapolated to the full pupil so as to extract the information about the optical performance of the complete instrument or being left as is if it is sufficient to make do with local information. This assumption is entirely valid when dealing with thermal or mechanical tests since a movement of the mirrors or of the structures supporting them involves exactly variations in the WFE at low frequencies.

More precisely, the ratio of the second diameter of the autocollimation mirror to the first diameter of the telescope lies between 30% and 80%. Preferably, the ratio of the second diameter to the first diameter equals about 60%.

It is possible to use fibred sources so as to perfectly control the geometry of the source. The photo-detection block can comprise several sources, for example two optical fibres at the level of each point of the field for which a measurement of optical performance is desired. The sources may be offset along the optical axis so as to be defocused with respect to one another.

As has been seen, the bench according to the invention makes it possible, in particular, to carry out these performance measurements in an uncontrolled environment, the telescope being placed in the air and the micro-vibrations not being attenuated by anti-vibratory devices. Of course, it is also possible to carry out conventional measurements of optical performance in a stabilized vacuum enclosure. Estimation of the WFEs by way of the wavefront analyzer is then more precise.

Figure 3:
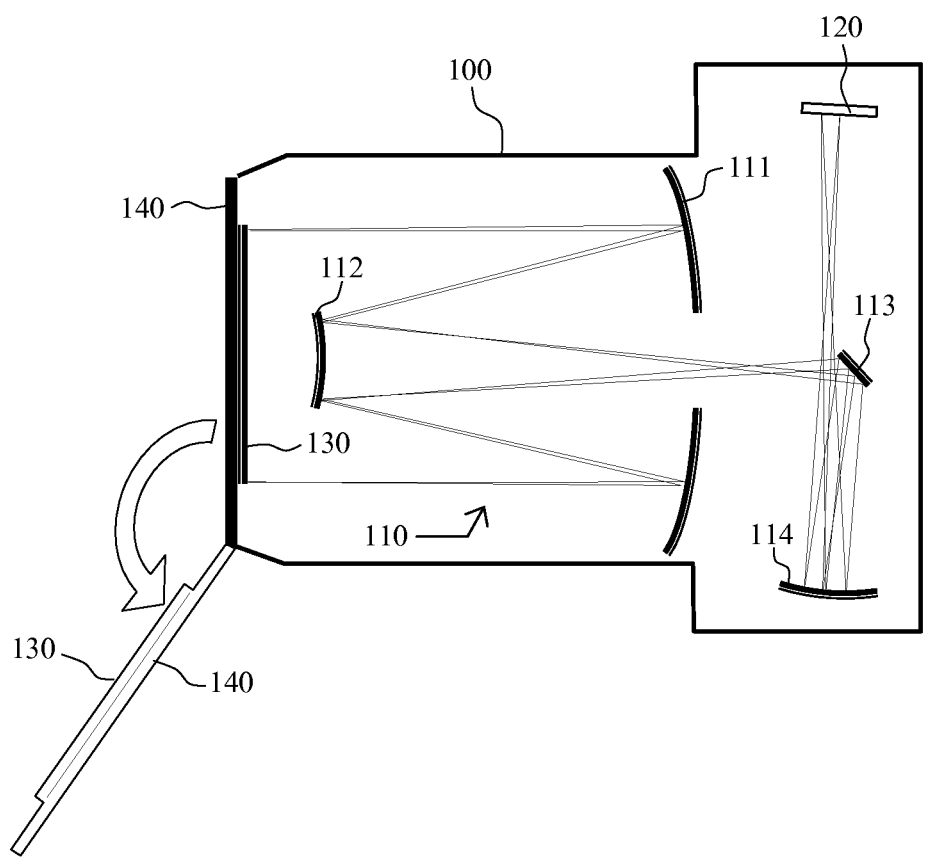
FIG. 3 represents an auto-checkable telescope according to the invention.

The bench according to the invention can also be used on an observation satellite placed in orbit and comprising a space telescope 100, as seen in FIG. 3. The telescope is then auto-checkable.

It suffices to supplement it with a retractable plane mirror 130 arranged on the movable hood 140 which protects the instrument when it is not operational. This hood is positioned in front of the telescope 100 during an adjustment phase, and the source or sources of the focal plane is or are illuminated as explained hereinabove. In FIG. 3, the hood 140 in the closed or test position is represented by black lines, it is represented in white silhouette in the open position.

The orientation of the hood 140 must be such that the associated mirror 130 is in an auto-collimation position with respect to the optic 110 of the telescope during this adjustment phase.

In this configuration, the plane mirror, the sources and the analysis means then have characteristics much like those used on a ground test bench. Thus, the ratio of the second diameter to the first diameter lies between 30% and 80%. Preferably, the ratio of the second diameter to the first diameter equals about 60%.

The invention claimed is:

1. An optical checking bench for an optical instrument of telescope type, the instrument comprising an optical objective, a photo-detection housing arranged at the focus of said optical objective and at least one light source arranged in the vicinity of said photo-detection housing, the optical pupil of the optical objective having a first diameter, the bench comprising:
a plane mirror having a second diameter that is smaller than the first diameter and means to arrange said plane mirror in such a way that the image of the light source given by the optical objective and reflected by said plane mirror is focused on the photo-detection housing, and
means for analyzing said image received to determine the optical quality of the telescope.

2. The optical checking bench as claimed in claim 1, wherein the analysis means comprise a wavefront analyzer for the images received so as to estimate a wave-front error of the instrument.

3. The optical checking bench as claimed in claim 1, wherein the ratio of the second diameter to the first diameter lies between 30% and 80%.

4. The optical checking bench as claimed in claim 3, wherein the ratio of the second diameter to the first diameter equals about 60%.

5. The optical checking bench as claimed in claim 1, wherein the light source comprises at least one illuminating source and one optical fibre one of the ends of which is arranged in the vicinity of the photosensitive surface of the photo-detection housing.

6. The optical checking bench as claimed in claim 5, wherein the light source comprises at least two illuminating optical fibres, the optical objective working at a predetermined wavelength, the first optical fibre being arranged in a first plane perpendicular to the optical axis of the objective and the second optical fibre arranged in a second plane parallel to the first plane and offset with respect to the first plane.

7. An optical telescope comprising an optical objective, a photo-detection housing arranged at the focus of said optical objective and at least one light source arranged in the vicinity of said photo-detection housing, the optical pupil of the optical objective having a first diameter, the telescope further comprising a movable hood having two positions, a first open or usage position to uncover the whole of the pupil of the objective and a second closed or test position to protect the whole of the pupil of the objective, the movable hood comprising:
a plane mirror having a second diameter that is smaller than the first diameter and arranged in such a way that, the movable hood being in the closed position, the image of the light source given by the optical objective and reflected by said plane mirror is focused on the photo-detection housing,
the telescope further comprising means for analyzing said image received to determine the optical quality of the telescope.

8. The optical telescope as claimed in claim 7, wherein the ratio of the second diameter to the first diameter lies between 30% and 80%.

9. The optical telescope as claimed in claim 8, wherein the ratio of the second diameter to the first diameter equals about 60%.

10. The optical telescope as claimed in claim 7, wherein the light source comprises at least one illuminating source and one optical fibre one of the ends of which is arranged in the vicinity of the photosensitive surface of the photo-detection housing.

11. The optical telescope as claimed in claim 10, wherein the light source comprises at least two illuminating optical fibres, the optical objective working at a predetermined wavelength, the first optical fibre being arranged in a first plane perpendicular to the optical axis of the objective and the second optical fibre arranged in a second plane parallel to the first plane and offset with respect to this first plane.

12. The optical telescope as claimed in claim 7, wherein the analysis means comprise at least one wavefront analyzer for the images received so as to estimate a wave-front error of the instrument.

* * * * *